March 2, 1948.  J. BERGIER ET AL  2,436,785
AUTOMATIC MEASUREMENT OF LENGTH BY MEANS OF ELECTRICAL IMPULSES
Filed Feb. 26, 1943
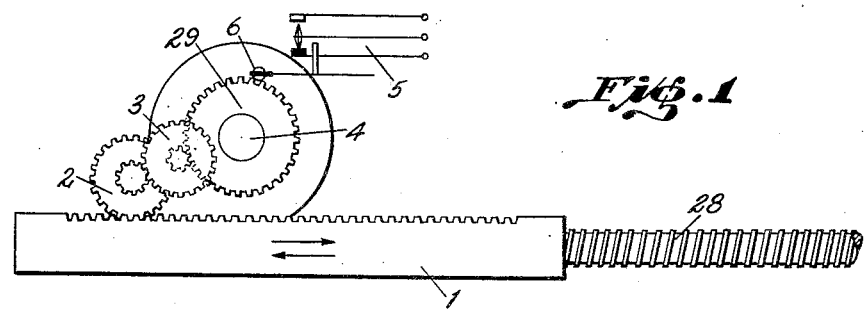
Fig. 1
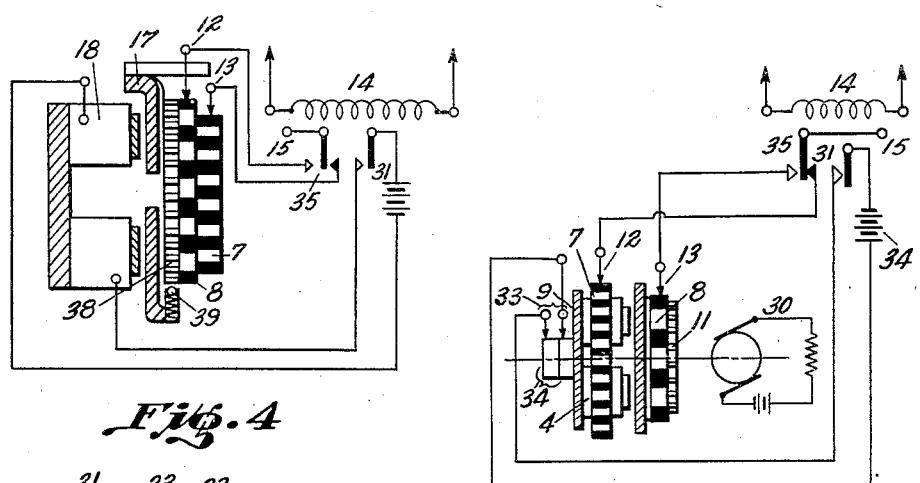
Fig. 4  Fig. 2
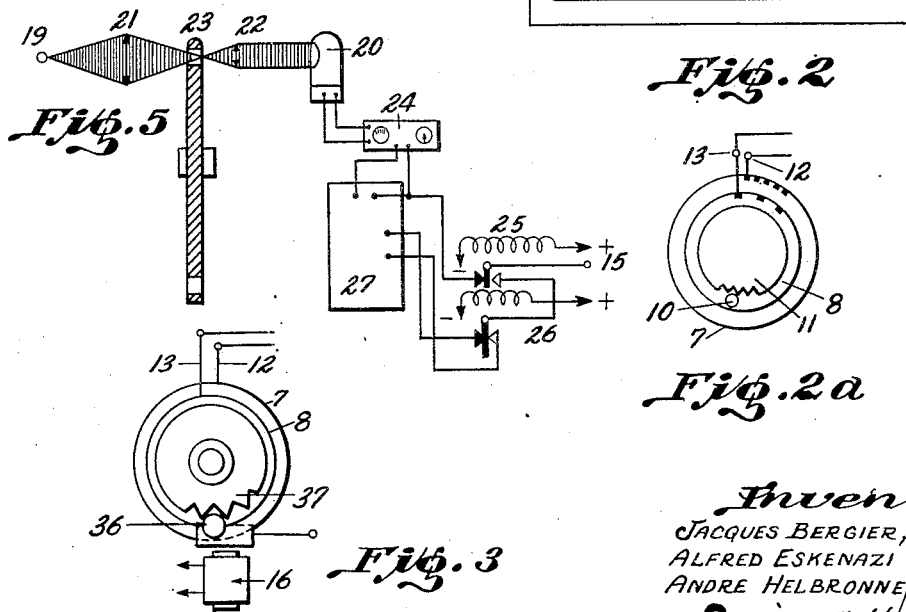
Fig. 5
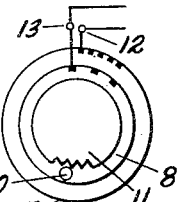
Fig. 2a
Fig. 3
Inventors
JACQUES BERGIER,
ALFRED ESKENAZI and
ANDRE HELBRONNER
By Louise O'Neil
Attorney Patented Mar. 2, 1948

2,436,785

UNITED STATES PATENT OFFICE 2,436,785

AUTOMATIC MEASUREMENT OF LENGTH BY MEANS OF ELECTRICAL IMPULSES

Jacques Bergier, Alfred Eskenazi, and André Helbronner, Lyon, France; vested in the Attorney General of the United States Application February 26, 1943, Serial No. 477,310

2 Claims. (Cl. 177—380)

The present invention relates to a device for emitting a series of identical electrical impulses proportional to the amplitude of motion of the moving part of a machine or tool.

The ratio, i. e., number of impulses per inch to a degree of rotational displacement is absolutely constant, and no impulse is lost when the direction of motion is reversed.

There are various commercial applications of such device, among the more important of which are:

Control of automatic machines by means of a series of impulses.

Recording of motion and use of said records for automatic control of machines and tools.

Measurement of length from a distance.

The drawings illustrate diagrammatically examples of the new device.

Fig. 1 is a side view of one embodiment of our new device.

Fig. 2 shows a diagrammatic view partly in section of a modification of the new device.

Fig. 2a illustrates a side view of the device shown in Fig. 2.

Fig. 3 shows a side view of a modification of a part of the device of Figs. 2 and 2a.

Fig. 4 illustrates another modification of new device in section.

Fig. 5 illustrates a further modification of the device, using a photo-electric cell in the production of the electric impulses.

A serrated bar or rack 1 is slidably mounted on the stationary part of the controlled machine, machine-tool, or other tool, not shown, which bar is driven by a spindle 28 or other driving means. The working part, for example, the tool holder of a machine, not shown in detail, carries a train of gears 2, 3, gear 2 being in engagement with rack 1. A drum 29 which has a toothed surface, the grooves running in the axial direction, is arranged to rotate about a stationary shaft 4 and is also in driving connection with the gear train 2, 3. Inside of the drum 29 there is located a helical spring (not shown in the drawing), one end of which is connected to shaft 4, while the other end is attached to the drum 29. Said spring is arranged in such a manner that, when the slidable rack 1 moves to the left from a middle position and thereby operates the train of gears 2, 3 and the drum 29, the spring is compressed, and when the rack moves to the right from the same middle position the spring is expanded. Thus the play between the gears is automatically compensated for, as by a compensator.

The toothed surface of the drum 29 rotating about the shaft 4 produces the electrical impulses by actuating the contactor 5 with the aid of a roller 6. For example, in a machine tool, a given unit of displacement, for instance 1/100 of an inch, may correspond to one impulse independent of the position of the driving spindle. Moreover, the play and the conditions of wear of the spindle do not interfere with the operation of the device, which always emits impulses, whose number is proportional to the actual displacement of the tool. The ratio of the number of impulses to unit of displacement can be varied by changing the gear ratio of the train of gears.

The spring contained in the toothed drum must be capable of sustaining several complete turns of the drum 29 and, therefore, must be very long. Such a spring is very cumbersome and its resistant torque is not constant, but instead increases as the spring is compressed. To avoid this inconvenience it is possible to produce the compensating torque by another braking means, for example, a counterweight acting on the drum 29, or a small electric motor, whose rotor is attached to drum 29. This motor should be able to sustain an over-voltage, when rotating in a direction opposite to its motor torque. Advantageously such motor may consist of a small D. C.-motor having a permanent magnet field said motor being connected to a small battery. A diagrammatic view of such brake-motor system is shown at 30 in Fig. 2.

It is often desirable to change the speed during the working of a piece in a machine tool. For example, the return of the cutting tool of a lathe to its starting position can be effected with a lesser precision than the forward or working movement. In Figs. 2 and 2a a device is illustrated by which such change of speed of the movable part of a machine can be automatically effected. Disks 7 and 8 of electrically conducting material, such as metal, are provided with insertions of insulating material at regular intervals on their periphery. The number of these insertions is different in the two disks. Such disks constitute electrical commutators. For example, the disk 8 may have 20 insertions, while the disk 7 has 100. The portions of conducting material of the disks between the insulating insertions act in cooperation with stationary brushes 12 and 13 as means for producing electrical impulses, when the disks rotate. Said impulses act in a manner known per se on the controlling mechanism for the advance or return of the tool. Thus for example the disk 8 will produce 20 impulses for a given displacement, for example 1 millimeter, while the disk 7 produces 100 impulses for the same rate of displacement. The disk 7 is mounted to rotate about shaft 4 and is provided with an electromagnet clutch 9 which rotates together with said disk 7 and upon energization establishes a driving connection between disks 8 and 7. The energization current for example supplied from a battery 34, is conducted to the clutch 9 over slip-rings 34 forming part of said clutch 9 and two stationary brushes 33 cooperating with said slip rings. When the clutch 9 is energized, the disk 8 is not attracted by the electro-magnetic clutch 9, rather is stopped by a spring-urged roller 10 which is forced in the recesses between the teeth of a stationary pinion 11, as shown in Figure 2a. Thereby the disk 8 is always stopped in such a position that an insulated section is under brush 13. Such mechanism is necessary, because otherwise impulses may get lost in the moment of speed changes of the controlled machine. Such might occur, when the impulses are first produced with the aid of the disk 7 and change-over is to be made to the disk 8, the brush 13 should be positioned in the middle of an insulating section on disk 8 to avoid the introduction of an error during the change-over. This is insured by the mechanism shown in Fig. 2a which is arranged in such a manner that the disk 8 always starts to rotate from a position in which the brush 13 contacts the middle portion of an insulating section. Without said holding mechanism for disk 8, it would happen that the brush 13 contacts the conducting part of the disk 8 between two insulating sections at the moment of speed-change, with the result that an impulse corresponding to ½₀ of a millimeter would be sent in excess, while some 100th of millimeter impulses would have been lost and the errors resulting at each change of speed would accumulate.

The change of speed is effected upon energization of the relay 14. When this relay is not energized, the impulses are produced by disk 7 in co-operation with brush 12 and the impulse current flows to the controlled drive or advance mechanism of the machine tool, not shown, through the relay contact pair 35, which is then closed in the right position, and through lead 15. The conducting portions of the impulse disks are internally grounded and said ground connection is used as return path the impulse current to the controlled mechanism. If on the contrary the coil of said relay 14 is energized by connecting said coil to a source of current, not shown, the contact pair 31 is closed, and the brush 13 is connected to lead 15 through the contact pair 35, now in the left position, and the clutch 9 is energized due to closure of contact pair 31 and establishes the driving connection between disks 8 and 7.

Instead of providing a clutch mechanism, as shown in Figure 2, a modified structure may be used which is shown in Figure 3 in front view. As in Figure 2, a contact disk 7 cooperating with stationary brush 12 is mounted to rotate about shaft 4. There is also provided a contact disk 8 cooperating with the stationary brush 13. Said two disks or commutators 7 and 8 have different numbers of insulated insertions on their respective peripheries. The disks 7 and 8 are slightly pressed together for example, by a spring acting in axial direction so that they can rotate together due to the friction acting between the disks. The disk 8 can be stopped in a position in which the brush 13 contacts an insulated portion on its periphery by a stationary spring-urged roller 36 which engages the recesses between the teeth of a pinion 37 directly attached to said disk 8. An electromagnet 16 is cooperatively connected with said spring-urged roller 36 in such a manner that upon energization said electro-magnet frees said roller 36 and thus allows the pinion 37 and the disk 8 to rotate together with the disk 7. The magnet 16 is energized in the same manner as the clutch 9 in Figure 2 by means of a relay 14, and said relay and the electric connections have been omitted in Figure 3 because they are identical with those in Figure 2.

In Figure 4 a stationary electromagnet 18 is used which has similar function as the rotating clutch in Fig. 2. The windings of the electromagnet 18 are energized over a relay 14 in the same manner as the clutch windings in Figure 2. Upon energization, the electromagnet 18 attracts a rotatably mounted armature 17 and thereby prevents it from rotating with the contact disks 7 and 8 which are both rotatably mounted on the same shaft as said armature 17. When the electromagnet 18 is not energized the armature 17 rotates together with the disks 7 and 8, whereby the torque from disks 7 and 8 is transferred to armature 17 over a pinion 38 directly mounted on disk 8 and a spring-urged roller 39 connected to said armature 17, said roller 39 being pressed into the recesses between the teeth of said pinion 38. A stationary brush 13 is cooperating with disk 7 and a brush 12 attached to a side arm of armature 17, engages disk 8. The spring-urged roller 39 is arranged in such a manner that, when the armature 17 is not attracted by electromagnet 18, brush 12 contacts an insulating piece on the periphery of disk 8. When the relay 14 is energized, electromagnet 18 attracts armature 17, whereby the latter is stopped from further rotation with disks 7 and 8. Brush 12 which previously contacted an insulating portion on the periphery of disk 8 is now carrying the impulse current produced by the rotating disk 8 and is supplying said impulse current through contact pair 35 to lead 15 as in Figure 2. The energization circuit for electromagnet 18, closed by the contact pair 31 of the relay 14, is also the same as in Fig. 2.

It is noted that in machines controlled by means of electrical impulses the changing of the rate of displacement occurs, when the last impulse in a series of impulses has been counted. Said last impulse is effective only when the current is cut off in the impulse counter. As a matter of fact, most impulse counters are built in such a manner that they advance step by step, when a pawl which has been set for the arrival of the current impulse falls back when the current is cut off. It is obvious that at this moment the impulse brushes 12 or 13, respectively, are passing through an insulated section. Therefore, as at this instant the counting ratio of the counter is changed, i. e., said counter is made to register $n$ impulses as one, where $n$ is a number greater than unity, the speed ratio may be changed without using the devices, shown in Figure 2, 3, and 4. This is advantageous when the impulses are produced by means of a photo-electric cell system, in which the use of clutch or other mechanical parts is impractical.

It should be understood that in carrying out our invention we may employ any of several well known electrical systems for registering a plurality of impulses as one.

In Fig. 5 the combination of an impulse emitter with a photo-electric cell with impulse reducing counter is diagrammatically illustrated. An electrical lamp 19 emits a light beam which is received by the photo-electric cell 20. The light beam passes between lamp 19 and photo-electric cell 20 through lenses 21 and 22 and perforations in a disk 23 which is driven by a train of gears 2 and 3 such as shown in Fig. 1, and the play between the gears is compensated for as in the embodiments afore-mentioned. The electric impulses produced by the rotation of the disk 23 are amplified in an amplifier 24 connected to the photo-cell 20. The energized impulses are then sent to the speed reducing counter 27. In the example shown in Fig. 5 said counter 27 has two ratios which can be selected by energizing the one or both of the relays 25 and 26 which are in Figure 5 substituting for the relay 14 in Figure 2. If neither of said two relays is energized the speed reducing counter 27 is not actuated and the relay switches are in a position that the impulses produced in the photo-electric cell 20 and amplified in amplifier 24 are directly sent to lead 15. When relay 25 is energized, the contact pair of said relay is switched to a position, whereby the reducing counter is introduced into the circuit between amplifier 24 and lead 15 with the result that a current with fewer impulses is sent out. A second reducing ratio is obtained when, in addition to relay 25, relay 26 is energized, whereby the inner circuit of the reducing counter is charged.

What we claim is:

1. In a device for producing electrical impulses in number proportional to the extent of movement between relatively stationary and fixed parts of a machine, commutator discs having conducting and insulating segments, rotatably mounted side by side on said stationary part, said discs being formed with a different number of conducting segments operating to transmit controlling impulses from the commutator segments, operating connections between a movable part of said machine and one of said discs to rotate said one disc, an electromagnetic clutch carried by said discs and adapted when energized to cause the other disc to be rotated through said one disc, transmitting circuits corresponding to the respective brushes and conducting segments of the respective discs and relay circuits for energizing the transmitting circuits corresponding to said one disc and alternately energizing said clutch and the transmitting circuits corresponding to the other disc.

2. The device according to claim 1 wherein the other disc is formed with a part having a series of peripheral notches and a spring-pressed member is provided adapted to enter the notches to ensure stoppage of said other disc with a brush on an insulating segment whenever the clutch is disengaged.

J. BERGIER.
A. ESKENAZI.
A. HELBRONNER.

REFERENCES CITED

The following references are of record in the file of this patent:

UNITED STATES PATENTS

| Number | Name | Date |
| --- | --- | --- |
| 1,391,653 | Meitner | Sept. 20, 1921 |
| 1,391,652 | Meitner | Sept. 20, 1921 |
| 1,296,440 | Sperry | Mar. 4, 1919 |
| 2,261,945 | Abel | Nov. 11, 1941 |
| 2,196,231 | Ridgeway | Apr. 9, 1940 |
| 1,755,340 | Sperry | Apr. 22, 1930 |
| 2,249,029 | Mullerheim | July 15, 1941 |
| 1,823,221 | Smith | Sept. 15, 1931 |